No. 794,607. PATENTED JULY 11, 1905.
R. H. GOLDSBOROUGH.
TURBINE.
APPLICATION FILED DEC. 10, 1903.

5 SHEETS—SHEET 1.

Witnesses
L. Armstrong.
G. Ayres.

Inventor
Richard H. Goldsborough.
By
G. Ayres
Attorney

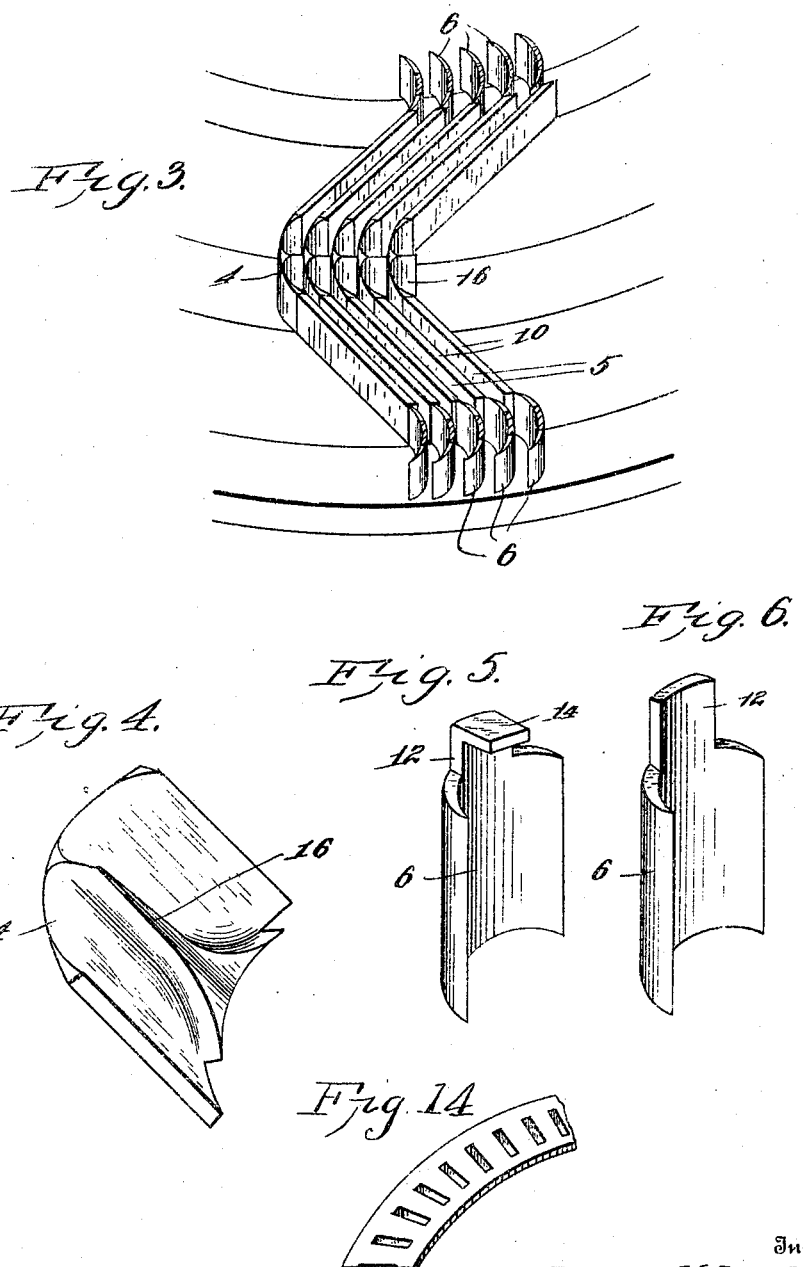

No. 794,607. PATENTED JULY 11, 1905.
R. H. GOLDSBOROUGH.
TURBINE.
APPLICATION FILED DEC. 10, 1903.

5 SHEETS—SHEET 3.

Witnesses
L. Armstrong
G. Ayres

Inventor
Richard H. Goldsborough

By G. Ayres
Attorney

No. 794,607. PATENTED JULY 11, 1905.
R. H. GOLDSBOROUGH.
TURBINE.
APPLICATION FILED DEC. 10, 1903.

5 SHEETS—SHEET 4.

Witnesses
L. Armstrong.
G. Ayres.

Inventor
Richard H. Goldsborough.
By
G. Ayres
Attorney

No. 794,607. PATENTED JULY 11, 1905.
R. H. GOLDSBOROUGH.
TURBINE.
APPLICATION FILED DEC. 10, 1903.
5 SHEETS—SHEET 5.
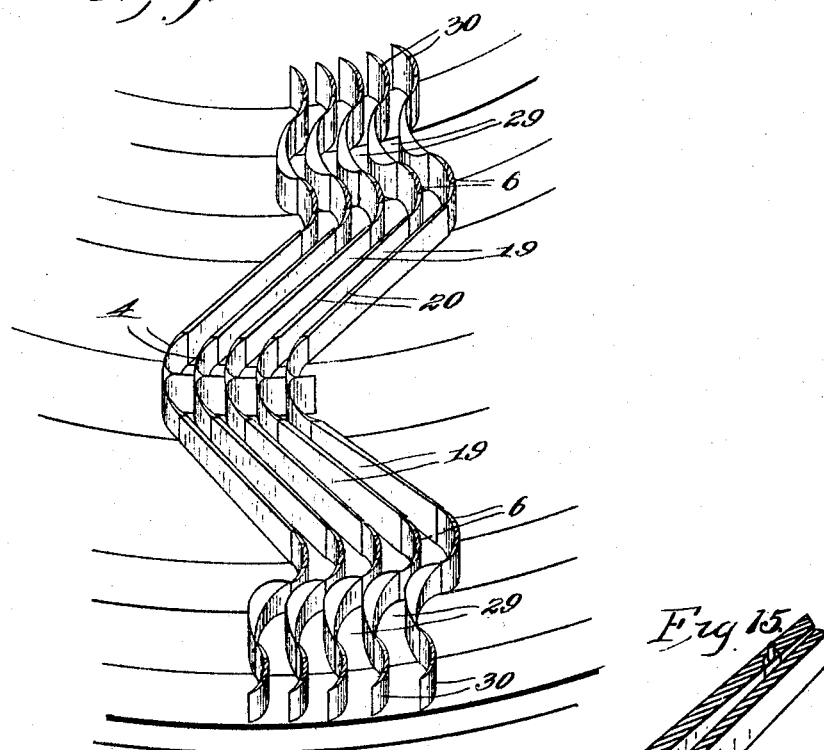
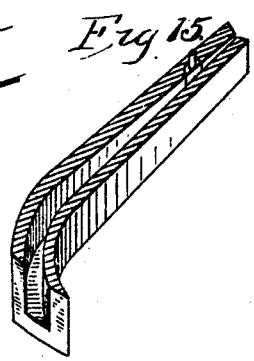
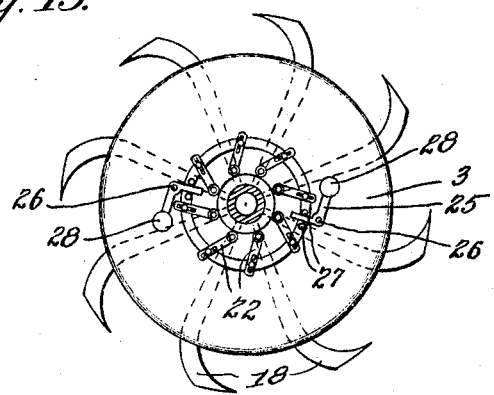
Witnesses
L. Armstrong.
G. Ayres.
Inventor
Richard H. Goldsborough,
By G. Ayres
Attorney No. 794,607. Patented July 11, 1905.

UNITED STATES PATENT OFFICE.

RICHARD H. GOLDSBOROUGH, OF WASHINGTON, DISTRICT OF COLUMBIA.

TURBINE.

SPECIFICATION forming part of Letters Patent No. 794,607, dated July 11, 1905.

Application filed December 10, 1903. Serial No. 184,649.

*To all whom it may concern:*

Be it known that I, RICHARD H. GOLDSBOROUGH, a citizen of the United States, residing at Washington, in the District of Columbia, have invented new and useful Improvements in Turbines, of which the following is a specification.

My invention relates to compound types of turbine-motors; and it consists in the constructions, combinations, and arrangements herein described and claimed.

The objects of my invention are to provide a construction in which heat energy can be efficiently transformed into kinetic energy and in which the kinetic energy can be advantageously employed at a low peripheral speed of the motor.

A further object of my invention is to provide a turbine-motor in which all lateral thrust on a shaft will be avoided and local oscillations while getting up to speed obviated.

Figure 1:
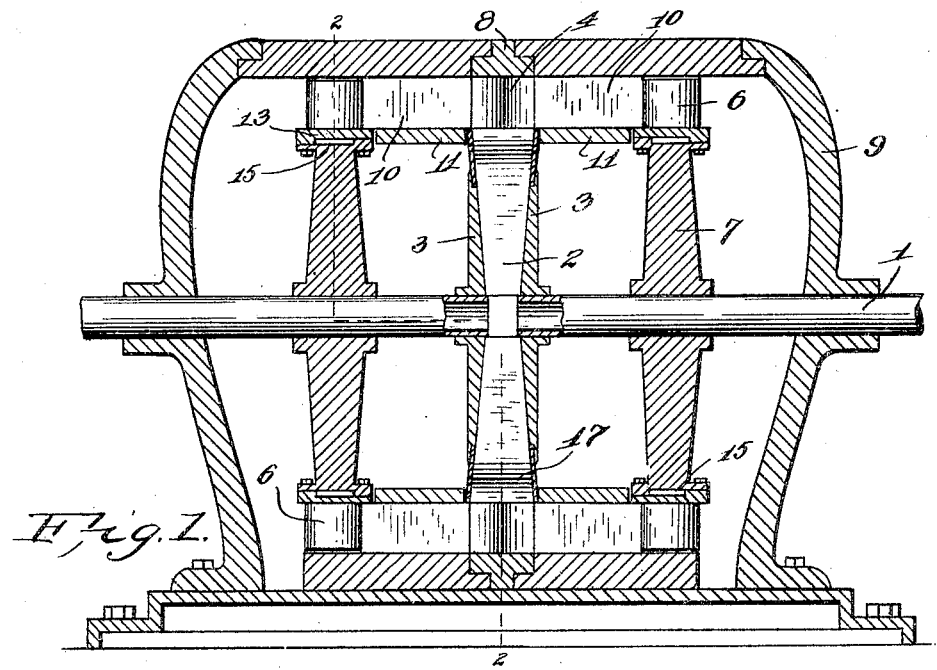
Figure 2:
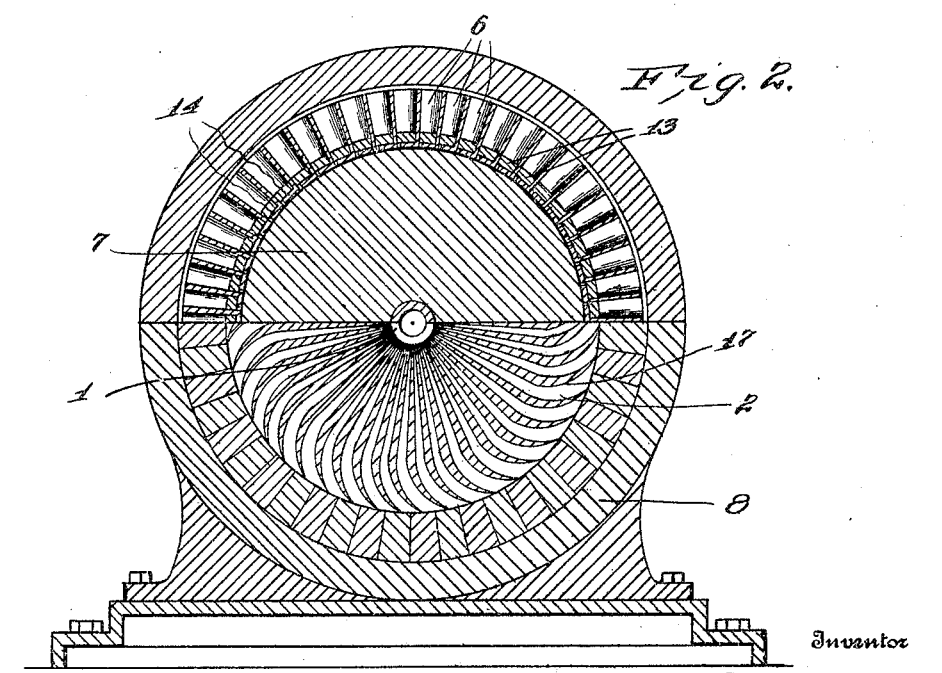
Figure 7:
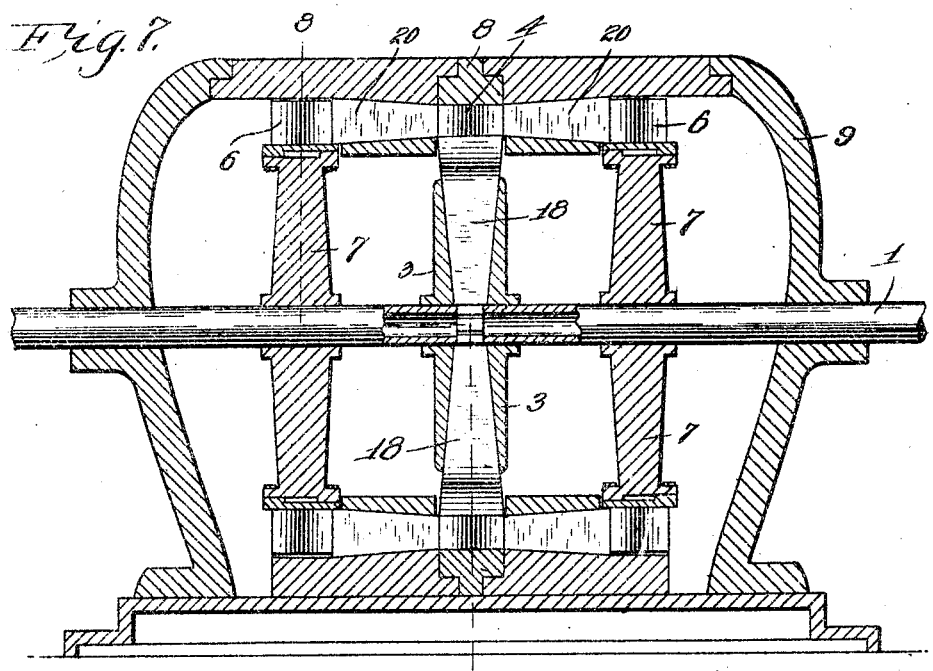
Figures 8, 9:
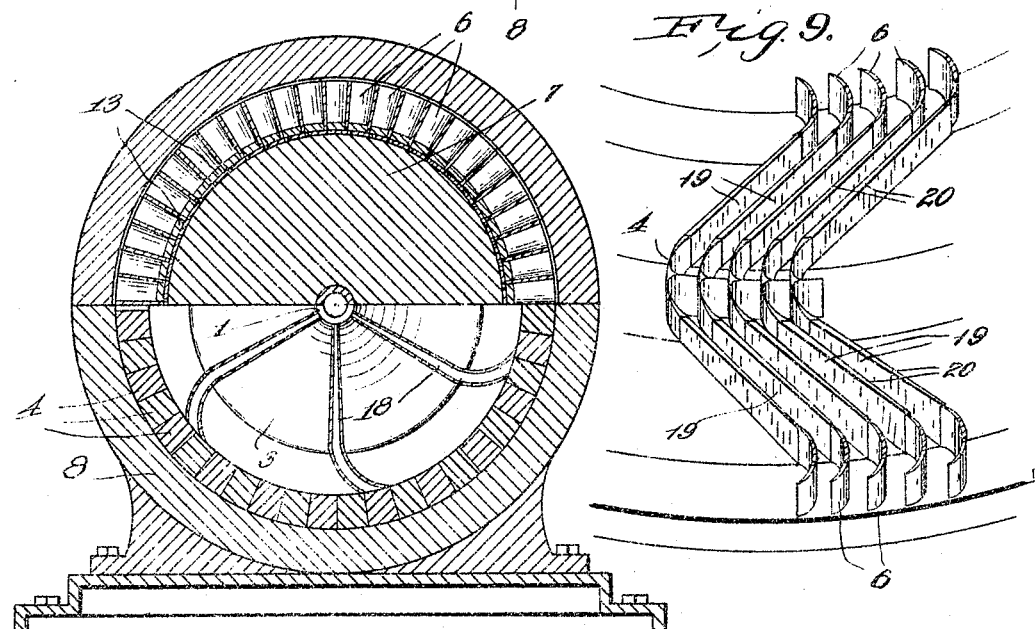
Figure 10:
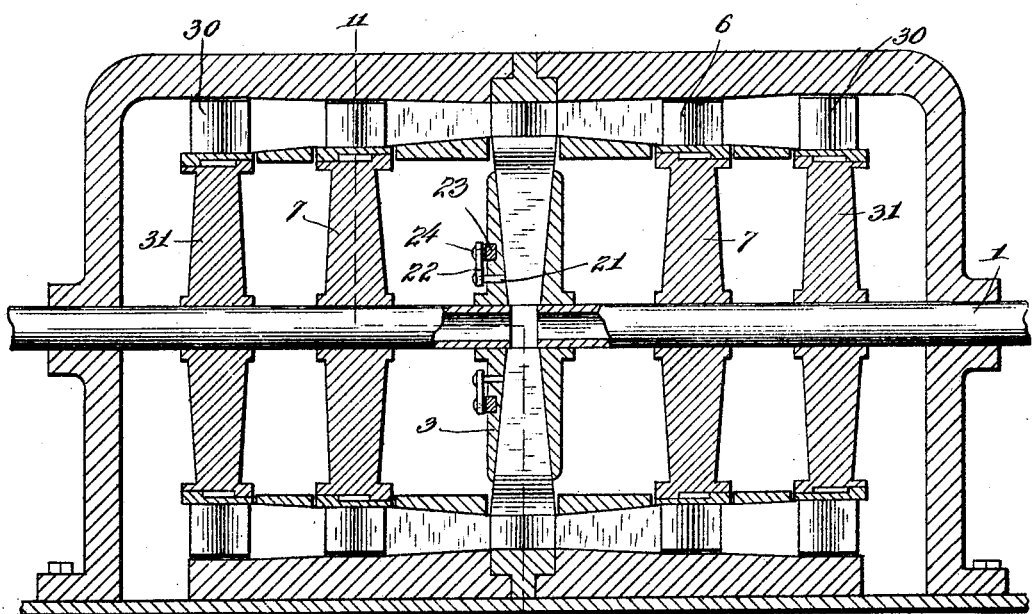
Figure 11:
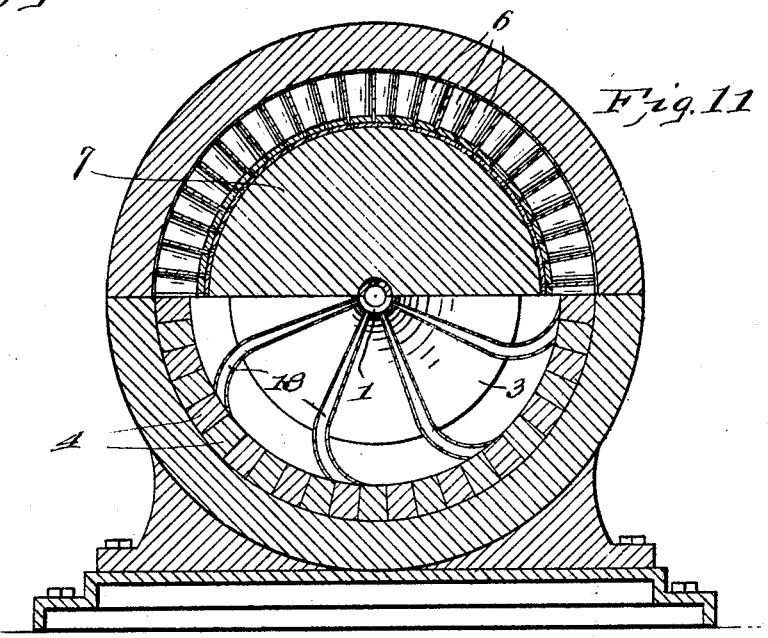

Referring to the accompanying drawings, forming a part of this application, and in which similar reference-symbols indicate corresponding parts in the several views, Figure 1 is an axial vertical sectional view illustrating one embodiment of my invention. Fig. 2 is a sectional view on the line 2 2 of Fig. 1. Fig. 3 is a detail perspective view illustrating the arrangement of the abutments, the incline ports, and the turbine-vanes. Fig. 4 is a detail perspective view, on a larger scale, for clearly illustrating a preferred form of abutment. Fig. 5 is a detail perspective view showing one of the vanes provided with an extension bent for reception in the recessed rim of the turbine-wheel. Fig. 6 is a view similar to Fig. 5, showing the extension as formed previously to being bent. Fig. 7 is an axial vertical sectional view illustrating a modified construction. Fig. 8 is a sectional view on the line 8 8 of Fig. 7. Fig. 9 is a detail perspective view illustrating the arrangement of the abutments, inclined ports, and turbine-vanes in the constructions of Figs. 7 and 8. Fig. 10 is an axial vertical sectional view illustrating a multiple compound construction. Fig. 11 is a sectional view on the line 11 11 of Fig. 2. Fig. 12 is a detail perspective view illustrating the arrangement of the abutments, ports, and turbine-vanes in the construction of Figs. 10 and 11; and Fig. 13 is a detail elevation showing one form of governing means applied to the multiple compound construction. Fig. 14 is a fragmentory perspective view illustrating the construction of the rings for securing the vanes in position, and Fig. 15 is a detail view clearly showing the construction of the valves 21.

Referring to the drawings, 1 indicates a hollow shaft, which is adapted to be placed in communication with a supply of steam or other fluid medium. Preferably both ends of said shaft are so connected in order to prevent axial thrust thereof.

2 indicates an annular series of curved conduits arranged in communication with the interior of the hollow shaft and secured thereon by any suitable means, such as clamping-disks 3. A plurality of abutments 4 are arranged about the periphery of said annular series of conduits and are constructed to deflect the fluid discharge from said conduits laterally toward each side thereof. A series of ports 5, arranged at each side of the abutments, are constructed to receive the discharge therefrom and lead the same to an annular series of vanes 6, extending from the periphery of a turbine-wheel 7, carried by the common shaft 1. These ports are inclined forwardly in the direction of rotation of the turbine-wheel, as clearly shown in Fig. 3.

As shown in Figs. 1 and 2, the abutments 4 are carried by an annular member 8, which constitutes a part of the turbine-casing 9, and the partitions 10 between the several ports 5 are supported against the casing by the annular members 11.

The vanes 6 can be secured to the peripheries of the tubine-wheel 7 in any suitable manner, as by providing said vanes with extensions 12, which can be inserted through slots in a ring 13 and secured by bending their extensions, as indicated at 14 in Figs. 2 and 5. In this construction the periphery of the turbine-wheel 7 is provided with a recess 15 for receiving the bent portions 14 of such extensions when the ring is bolted thereon.

This method of attaching the turbine-vane provides a very convenient and simple construction.

Referring especially to Figs. 3 and 4, the abutments 4 are preferably tapered to substantially a knife-edge adjacent the discharge-orifices of the curved conduits 2 and are provided with extensions 16 on their front or reacting faces, which are constructed to closely fit the back face of the next adjacent vane. The extensions 16 and front faces of the abutments are preferably formed to deflect forwardly and laterally the fluid medium impacting thereagainst and to finally discharge the same into the two series of ports 5. I find that a satisfactory construction is furnished by arranging the ports 5 at an angle approximating twenty degrees with the planes of their turbine-wheels 7.

In the operation of the above-described construction steam or other fluid medium is maintained at any desired pressure within the hollow shaft 1 and passing through the narrow entrance-orifices of the curved conducts 2 expands and impinges at a high velocity against the more abruptly curved portions 17 of said conduits, which constitute vanes, whereby its direction of flow is changed and a rotary motion imparted to the turbine-wheel. The steam or other fluid medium is then discharged from the curved conduits against the stationary abutments 4, thus producing a reaction tending to rotate the turbine-wheel. The stationary abutments are shown formed on the Pelton bucket principle and are constructed to produce a substantial reversal in the direction of flow of the fluid medium impinging thereon. The fluid medium impinging on the stationary abutments 4 is preferably gradually and uniformly deflected into the inclined ports 5, from which it is discharged against the turbine-vanes 6, thus furnishing additional power tending to turn the turbine-wheel. The turbine-vanes 6 are preferably so formed that the steam discharged therefrom will have practically no velocity relatively to said vanes, thus providing means for utilizing to the greatest practical extent the kinetic energy in the steam. The steam discharged from the vanes 6 flows into the turbine-casing 9, which can be arranged in free communication with the atmosphere or with a condenser. If desired, the turbine-casing 9 may constitute a condenser by the employment of the usual cooling coils or jets therein, thus producing a construction in which the turbine-wheels rotate in a rarefied medium, with a corresponding reduction of friction.

In the above construction the curved conduits 2 can be so proportioned that substantially the entire range of expansion in the steam or other fluid medium will occur prior to its discharge from said curved conduits, and said curved conduits are preferably provided with suitable means for automatically regulating the supply of fluid medium thereto—such, for example, as disclosed in my copending application Serial No. 181,061. In such construction the ports 5 can be constructed of uniform cross-section throughout; but the aggregate area of such ports would be greater than that of the discharged ends of the curved conduits to provide for the slower velocity of the fluid medium flowing through said ports.

It will be understood that in the above operation the kinetic energy of the fluid medium will be transformed into mechanical work, with a corresponding decrease in the velocity of flow of the fluid medium upon its impact against the increasingly-curved portions 17 of the curved conduits and upon its impact against the turbine-vanes 6, thereby furnishing a construction in which practically all of the kinetic energy of the fluid medium can be efficiently utilized at a low peripheral speed of the motor.

Figs. 7, 8, and 9 illustrate a modification, in which a relatively small number of curved hollow arms 18 are substituted for the curved conduits 2 of the prior construction, and the ports 19 are formed diverging to provide for expansion of the fluid medium while flowing therethrough. This divergence of the ports 19 is preferably obtained by increasing the width of their partition-walls 20, as clearly shown in Fig. 7, and by decreasing the thickness of said partition-walls, as shown especially in Fig. 9. In this construction the parts are so constructed and proportioned that the fluid expands through only a portion of its range prior to its discharge from the curved arms 18, and the expansion is substantially completed during the flow of the fluid medium through the diverging ports 19. By thus apportioning the total expansion of the fluid medium at different points along its travel the defects and loss of power due to eddy-currents and oscillations of pressure in the fluid medium are minimized.

Figs. 10, 11, 12, and 13 illustrate a multiple-compound construction having an annular series of curved conduits 18 arranged in communication with the hollow shaft 1, each conduit being provided at its entrance end with a regulating-valve 21, which carries a slotted link 22 at its outer end. A ring 23, shown slidably mounted on the disk 3, carries a plurality of pins 24, extending within the slots of the links 22. Bell-crank levers 25, pivotally supported at 26 on the disk 3, are arranged with one arm in engagement between two pins 27, carried by the ring 23, and with their other arms provided with a governor-weight 28. It will be clear that upon rotation of the disk 3 and its pivotally-supported levers 25 the latter will be actuated by centrifugal force to shift the ring 23, and thereby adjust the regulating-valves 21. Any desired number of levers 25 can obviously be employed and suitable spring means provided for maintaining them in their normal position. The multiple compound construction is similar to that illustrated in Figs. 7, 8, and 9, with the addition of divergent ports 29, arranged to receive the fluid medium discharged from the turbine-vane 6 and to deflect it against additional series of turbine-vanes 30, which latter are shown extending from the periphery of turbine-wheels 21, secured to the shaft 1.

The operation of the multiple compound construction is as follows: The fluid medium is maintained at any desired pressure within the hollow shaft 1, from which it passes into the curved conduits 18, the regulating-valves 21 providing means for insuring proper expansion of the fluid medium during its flow through said curved conduits. The fluid medium during its expansion in flowing through the conduits 18 acquires a high velocity and impinges against the more abruptly curved portions of said conduits, which constitute vanes, thereby being deflected and acting to impart a rotary motion to the turbine-wheel. The fluid medium is then discharged from the curved conduits against the stationary abutments 4, thus producing a reaction tending to rotate the turbine. The fluid medium is deflected by the abutments 4 into the diverging ports 19 and after expanding in flowing through said ports impinges against the turbine-vanes 6, thereby tending to produce rotation of their wheels 7. After being deflected from the vanes 6 the fluid medium is received in the diverging ports 29, which permit further expansion thereof and discharge it at high velocity against the turbine-vanes 30, from which it finally escapes to the atmosphere or to a condenser. It is obvious that additional divergent ports could be arranged to receive the discharge from the vanes 30 and to direct the same against other turbine-vanes and this arrangement multiplied to provide for any desired number of expansions. It will further be obvious that in all the above constructions the difference of pressure of the fluid medium against the front and rear walls of the curved conduits will act to produce rotation of the turbine-wheel.

Having thus described my invention, what I claim as new, and desire to secure by Letters Patent, is—

1. In a turbine, the combination of a rotor, a plurality of curved conduits carried by said rotor, annular series of vanes carried by said rotor, means for supplying an actuating medium to the inner ends of said curved conduits, and means for laterally deflecting the discharge from the outer ends of said curved conduits and directing it against said series of vanes, substantially as described.

2. In a turbine, the combination of a rotor, a plurality of curved conduits carried by said rotor, annular series of vanes carried by said rotor at both sides of said curved conduit, means for supplying an actuating medium to the inner ends of said curved conduits, and means for laterally deflecting the discharge from the outer ends of said curved conduits and directing it against said annular series of vanes, substantially as described.

3. In a compound turbine, the combination of a hollow shaft, an annular series of curved conduits carried by said shaft in communication with the interior thereof, a plurality of stationary abutments surrounding the periphery of said annular series of conduits and constructed to laterally deflect the discharge from the latter, a series of ports arranged to receive the lateral discharge from said stationary abutments, and a turbine-wheel secured to said shaft and carrying curved vanes on its periphery adjacent the discharge ends of said series of ports, substantially as described.

4. In a compound turbine, the combination of a hollow shaft adapted to be placed in communication with a fluid-supply, a turbine-wheel carried by said shaft and provided with an annular series of curved conduits arranged in communication with the interior thereof, a plurality of stationary abutments surrounding the periphery of said annular series of conduits and constructed to laterally deflect the discharge from the latter, a series of ports leading from each side of said abutments and inclined forwardly in the direction of rotation of said turbine-wheel, a turbine-wheel for each of said series of ports secured to said shaft and carrying curved vanes on its periphery arranged adjacent the discharge ends of the corresponding series of inclined ports, substantially as described.

5. In a compound turbine, the combination of a hollow shaft adapted to be placed in communication with a fluid-supply, a turbine-wheel carried by said shaft and provided with an annular series of curved conduits arranged in communication with the interior thereof, said conduits constructed with increasingly-curved portions adjacent their discharge ends to constitute vanes, a plurality of stationary abutments surrounding the periphery of said annular series of conduits and constructed to laterally deflect the discharge from the latter, a series of ports leading from each side of said abutments and inclined forwardly in the direction of rotation of said turbine-wheel, a turbine-wheel for each of said series of ports secured to said shaft and carrying curved vanes on its periphery arranged adjacent the discharge ends of the corresponding series of inclined ports, substantially as described.

6. In a compound turbine, the combination of a hollow shaft adapted to be placed in communication with a fluid-supply, a turbine-wheel carried by said shaft and provided with an annular series of curved diverging conduits arranged in communication with the interior thereof, a plurality of stationary abutments surrounding the periphery of said annular series of diverging conduits and constructed to laterally deflect the discharge from the latter, a series of ports leading from each side of said abutments and inclined forwardly in the direction of rotation of said turbine-wheel, a turbine-wheel for each of said series of ports secured to said shaft and carrying curved vanes on its periphery arranged adjacent the discharge ends of the corresponding series of inclined ports, substantially as described.

7. In a compound turbine, the combination of a hollow shaft adapted to be placed in communication with a fluid-supply, a turbine-wheel carried by said shaft and provided with an annular series of curved diverging conduits arranged in communication with the interior thereof, said diverging conduits constructed with increasingly-curved portions adjacent their discharge ends to constitute vanes, a plurality of stationary abutments surrounding the periphery of said annular series of diverging conduits and constructed to laterally deflect the discharge from the latter, a series of ports leading from each side of said abutments and inclined forwardly in the direction of rotation of said turbine-wheel, a turbine-wheel for each of said series of ports secured to said shaft and carrying curved vanes on its periphery arranged adjacent the discharge ends of the corresponding series of inclined ports, substantially as described.

8. In a compound turbine, the combination of a hollow shaft adapted to be placed in communication with a fluid-supply, a turbine-wheel carried by said shaft and provided with an annular series of curved conduits arranged in communication with the interior thereof, a plurality of stationary abutments surrounding the periphery of said annular series of conduits and constructed to laterally deflect the discharge from the latter, a series of diverging ports leading from each side of said abutments and inclined forwardly in the direction of rotation of said turbine-wheel, a turbine-wheel for each of said series of diverging ports secured to said shaft and carrying curved vanes on its periphery arranged adjacent the discharge ends of the corresponding series of inclined diverging ports, substantially as described.

9. In a compound turbine, the combination of a hollow shaft adapted to be placed in communication with a fluid-supply, a turbine-wheel carried by said shaft and provided with an annular series of curved conduits arranged in communication with the interior thereof, said conduits constructed with increasingly-curved portions adjacent their discharge ends to constitute vanes, a plurality of stationary abutments surrounding the periphery of said annular series of conduits and constructed to laterally deflect the discharge from the latter, a series of diverging ports leading from each side of said abutments and inclined forwardly in the direction of rotation of said turbine-wheel, a turbine-wheel for each of said series of diverging ports secured to said shaft and carrying curved vanes on its periphery arranged adjacent the discharge ends of the corresponding series of inclined diverging ports, substantially as described.

10. In a compound turbine, the combination of a hollow shaft adapted to be placed in communication with a fluid-supply, a turbine-wheel carried by said shaft and provided with an annular series of curved diverging conduits arranged in communication with the interior thereof, said diverging conduits constructed with increasingly-curved portions adjacent their discharge ends to constitute vanes, a plurality of stationary abutments surrounding the periphery of said annular series of diverging conduits and constructed to laterally deflect the discharge from the latter, a series of diverging ports leading from each side of said abutments and inclined forwardly in the direction of rotation of said turbine-wheel, a turbine-wheel for each of said series of diverging ports secured to said shaft and carrying curved vanes on its periphery arranged adjacent the discharge ends of the corresponding series of inclined diverging ports, substantially as described.

11. In a compound turbine, the combination of a hollow shaft adapted to be placed in communication with a fluid-supply, an annular series of curved conduits carried by said shaft in communication with the interior thereof, a plurality of stationary abutments surrounding the periphery of said annular series of conduits and constructed to laterally deflect the discharge from the latter, said abutments formed with a knife-edge opposed to the discharge-orifices of said curved conduits, a series of ports leading from each side of said stationary abutments, and a turbine-wheel for each series of ports secured to said shaft and carrying vanes on its periphery arranged adjacent the discharge end of the corresponding series of ports, substantially as described.

12. In a compound turbine, the combination of a hollow shaft adapted to be placed in communication with a fluid-supply, a turbine-wheel carried by said shaft and provided with an annular series of curved conduits arranged in communication with the interior thereof, a plurality of stationary abutments surrounding the periphery of said annular series of conduits and constructed to laterally deflect the discharge from the latter, a series of ports leading from each side of said abutments and inclined forwardly in the direction of rotation of said turbine-wheel, a turbine-wheel for each of said series of ports secured to said shaft and carrying curved vanes on its periphery arranged adjacent the discharge ends of the corresponding series of inclined ports, a series of ports, or passages, arranged to receive the discharge from each of said series of curved vanes, and turbine-wheels secured to said hollow shaft and carrying vanes on their peripheries adjacent the discharge ends of said last ports or passages, substantially as described.

13. In a compound turbine, the combination of a hollow shaft adapted to be placed in communication with a fluid-supply, a turbine-wheel carried by said shaft and provided with an annular series of curved conduits arranged in communication with the interior thereof, means constructed and arranged to automatically regulate the entrance-orifices of said curved conduits, a plurality of stationary abutments surrounding the periphery of said annular series of conduits and constructed to laterally deflect the discharge from the latter, a series of ports leading from each side of said abutments and inclined forwardly in the direction of rotation of said turbine-wheel, a turbine-wheel for each of said series of ports secured to said shaft and carrying curved vanes on its periphery arranged adjacent the discharge ends of the corresponding series of inclined ports, a series of ports, or passages, arranged to receive the discharge from each of said series of curved vanes, and turbine-wheels secured to said hollow shaft and carrying vanes on their peripheries adjacent the discharge ends of said last ports or passages, substantially as described.

14. In a turbine, the combination of a rotor, an annular series of vanes provided with clamping-lugs, securing means for securing said vanes to the rotor, said securing means provided with a series of apertures for receiving said lugs and constructed with extensions at both sides of said series of apertures, and means for engaging said extensions to lock the securing means in place, substantially as described.

15. In a turbine, the combination of a rotor, an annular series of vanes provided with clamping-lugs, securing means positioned on the periphery of the rotor for securing said vanes thereto, said securing means provided with a series of apertures for receiving said lugs and constructed to extend along the periphery of the rotor at both sides of said series of apertures, and means for engaging said extensions to lock the securing means in place, substantially as described.

16. In a turbine, the combination of a rotor, an annular series of vanes provided with clamping-lugs, and securing means for securing said vanes to the rotor, said securing means provided with a series of apertures and an inner recess for receiving said lugs and with extensions at both sides of said series of apertures, substantially as described.

In testimony whereof I have signed my name to this specification in the presence of two subscribing witnesses.

RICHARD H. GOLDSBOROUGH.

Witnesses:
 G. AYRES,
 EDWIN S. CLARKSON.